Aug. 26, 1941.　　K. W. HEDSTROM　　2,253,857
VELOCIPEDE
Filed Feb. 4, 1939
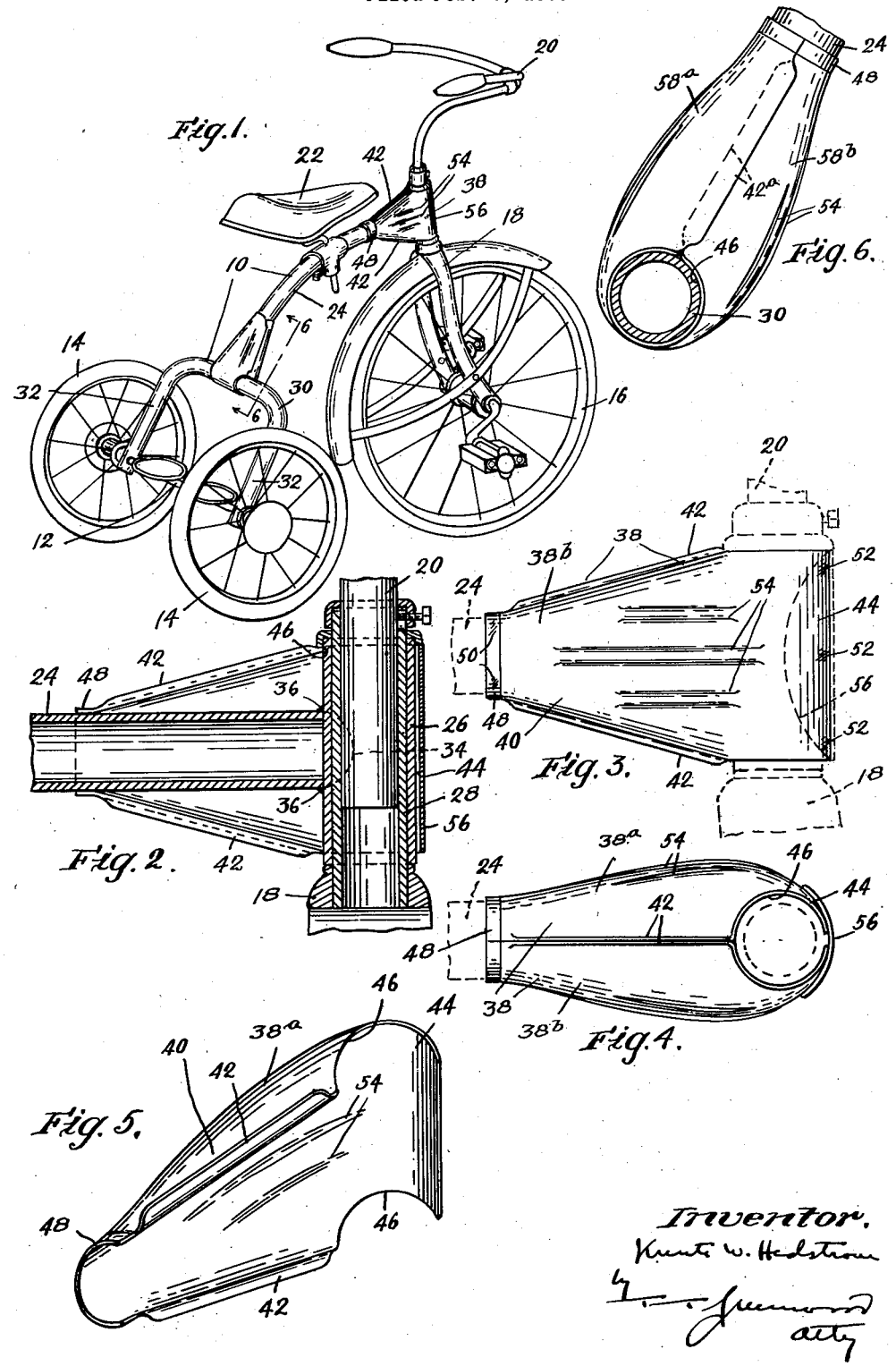

Patented Aug. 26, 1941

2,253,857

UNITED STATES PATENT OFFICE 2,253,857

VELOCIPEDE

Knute W. Hedstrom, Gardner, Mass., assignor to Hedstrom-Union Company, Gardner, Mass., a corporation of Massachusetts Application February 4, 1939, Serial No. 254,671

4 Claims. (Cl. 287—54)

This invention relates to velocipedes having a tubular frame or backbone.

In this type of velocipede the backbone comprises a tube which extends between the rear axle and the front steering fork. At the front end of the backbone tube it is joined with a short vertical tube in which the steering fork is journalled. The connection between the backbone tube and the steering fork tube is made ordinarily by electrically butt welding the two together. Usually the end of the backbone tube is cut off square and in the welding process metal is burned out of the end of the tube to form it into a more or less arcuate shape which fits the configuration of the steering fork tube. In this process irregular masses of metal are formed externally at the junction between the tubes which are unsightly in appearance and have to be ground off. The grinding frequently weakens the joint so that reinforcing metal has to be applied thereto by an arc welding process. Thus the welding of the two tubes to obtain a strong joint involves a series of operations and considerable time and expense.

It is an object of the present invention to eliminate the grinding and arc welding processes and to enclose the rough butt welded joint in a shield and to reinforce the joint by welding the shield to both the backbone and the steering fork tubes at points remote from the joint.

A further object of the invention is the provision of a shield or cover consisting of two identical sheet metal stampings which are capable of being disposed in confronting relation around the joint between the tubes and welded thereto.

The connection between the rear end of the backbone tube and the rear axle is made by a U-shaped tube having forks which carry the rear axle and an intermediate section which is welded to the rear end of the backbone tube in the same manner as the backbone and steering fork tubes are joined together.

It is a further object of the present invention to reinforce this back connection in the same manner as has been explained above.

It is another object of the present invention to employ a shield which is equally adaptable for the back connection as well as for the front connection.

A further object is generally to improve the construction of velocipedes.

Fig. 1 is a perspective view of a velocipede embodying the present invention.

Fig. 2 is a sectional detail in elevation taken through the front end of the backbone tube of Fig. 1, along the median line of the tube, and illustrating the improved construction.

Fig. 3 is a side elevation of the construction of Fig. 2 with the name plate omitted.

Fig. 4 is a plan view of the showing of Fig. 3 with the name plate added.

Fig. 5 is a perspective view of one of the sections of the shield.

Fig. 6 is a side view of a modified form of shield at the junction of the backbone tube and the rear wheel fork taken along line 6—6 of Fig. 1.

As herein illustrated the velocipede embodying the present invention includes a backbone or frame 10, the rear axle 12, the rear wheels 14 journalled thereon, the front wheel 16 journalled in the steering fork 18, the handle bar 20 and seat 22.

The frame or backbone 10 includes a backbone tube 24 which is joined at its front end with a crosswise and vertically disposed steering fork tube in which the post 28 of the steering fork 18 is journalled. The rear end of the backbone tube is joined to the intermediate part 30 of a U-shaped crosswise disposed tube having rearwardly depending legs 32 in which the rear axle 12 is located. The joint between the front end of the backbone tube and the steering post tube 26 is made by electric butt welding. The front end of the backbone tube 24 is cut off square and is abutted against the steering post tube, the two tubes being connected to the opposite poles of the welded current supply. The current is allowed to flow and burn into the end of the backbone tube until a recess is formed therein so that the front end of the tube conforms to the outer face of the steering fork tube as indicated by the line 34, see Fig. 2. The tubes are then manipulated to weld the parts rigidly together. The act of burning and welding causes metal to be thrown up and deposited around the joint between the tubes as indicated at 36.

Heretofore, as stated above, this material has been ground down to improve the appearance of the joint. In accordance with the present invention, however, the material is left in position thereby giving maximum strength to the joint and the joint is concealed within a shield 38.

The shield is formed of two members 38a and 38b which are identical and are formed in the same dies. Each shield member is formed from a single piece of sheet metal, wide at the front end and narrow at the rear end and tapered from the front end to the rear end and also being oval in cross section from the front end to the rear end and having upper and lower flat side portions 40. The edges of the side portions terminate in narrow lips 42 which from the shield 38 project respectively upwardly and downwardly. The large front portion 44 is formed into semi-circular shape to embrace approximately half of the steering fork tube 26 and the upper and lower parts of the shield member adjacent and partly formed by the front member 44 are provided with half circular openings 46 through which the upper and lower ends of the steering fork tube project. The smaller rear end of the shield member is formed with a semi-cylindrical neck 48 which embraces approximately one-half the circumference of the backbone tube.

The two identical shield members 38a and 38b are applied upon the two sides of the backbone and steering post tubes with the ribs 42 in close confronting relation or in contact. The two halves are welded to the tubes by spots 50 of electric welding applied at the cylindrical portions 48 and other spots 52 of electric welding applied to the front portions 44. The shield members thus are rigidly connected with the two tubes and form rigid connections between them. The shield members are also reinforced by longitudinal pressed out ribs 54.

Tests on such a construction in an attempt to separate the backbone and steering post tubes resulted in the breaking of the backbone tube outside the shield.

A name plate 56 is applied over the confronting ends 44 of the shield member and conceals the joints therebetween.

The joint between the backbone tube and fork member 30 is made in a manner similar to that explained in connection with the backbone tube and the steering post tube. This joint also is covered by a shield consisting of identical shield members 58a and 58b which members are identical with the shield members 38a and 38b except that the lips 42a overlap as is illustrated in Fig. 6 instead of being in confronting and outstanding relation as described in connection with the lips 42.

I claim:

1. In a velocipede, a backbone tube, a cross tube welded onto the end of said backbone tube, and a shield comprising two complemental stampings secured in juxtaposition about and enclosing the proximate parts of said tubes and the joint therebetween, said shield being rigid and each stamping being separately directly secured rigidly and permanently to both of said tubes remote from the joint by welding and constituting a brace for the joint.

2. In a velocipede, a backbone tube, a cross tube welded onto the end of the backbone tube, and a shield enclosing the joints between said tubes, said shield comprising a pair of stampings disposed about said tubes in edgewise confronting relation, said stampings being wide at the cross tube and overlying said tube on both sides of the backbone tube and engaged therewith and small at the other end where they surround and engage the backbone tube remote from the cross tube, said stampings being welded at their large and small ends to said cross and backbone tubes, said stampings having confronting lips at their confronting edges which lips outstand in the plane of said tubes.

3. In a velocipede, a backbone tube, a cross tube welded onto the end of the backbone tube and extended on opposite sides thereof, a shield enclosing the proximate parts of said backbone and cross tubes, said shield comprising a pair of identical stampings disposed in edgewise confronting relation about the tubes, each stamping comprising a narrow section which partially surrounds and engages the backbone tube remote from its joint with the cross tube and a wide part which partially surrounds and overlies the cross tube on both sides of the backbone tube, the wide and narrow parts being welded to said tubes, the stampings having lips extended from their edges between the wide and narrow parts, which lips are disposed relatively under and over the opposing stampings.

4. In a velocipede, a backbone tube, a steering fork tube welded onto the end of the backbone tube, and a shield enclosing the joints between the tubes, said shield comprising a pair of stampings disposed about said tubes in edgewise confronting relation, said stampings being wide at the steering fork tube and disposed in edgewise confronting relation on the side of the steering fork tube opposite to the backbone tube, said stampings overlying said steering fork tube on both sides of the backbone tube, said stampings overlying said steering fork tube and engaging therewith, said stampings being small at the other end where they surround and engage the backbone tube remote from the steering fork tube, said stampings being welded at their large and small ends to the steering fork and backbone tubes, the combination therewith of a plate applied to the wide parts of the stampings and bridging the joint between the wide parts of the stampings.

KNUTE W. HEDSTROM.